Feb. 20, 1945.   T. ABRAMS ET AL   2,369,634
CONTOUR FINDER
Filed Jan. 9, 1943   2 Sheets-Sheet 1

INVENTOR.
TALBERT ABRAMS
MILFORD B. MOORE
BY CLYDE B. VAN KIRK

Carroll R. Taber

Feb. 20, 1945.    T. ABRAMS ET AL    2,369,634
CONTOUR FINDER
Filed Jan. 9, 1943    2 Sheets-Sheet 2
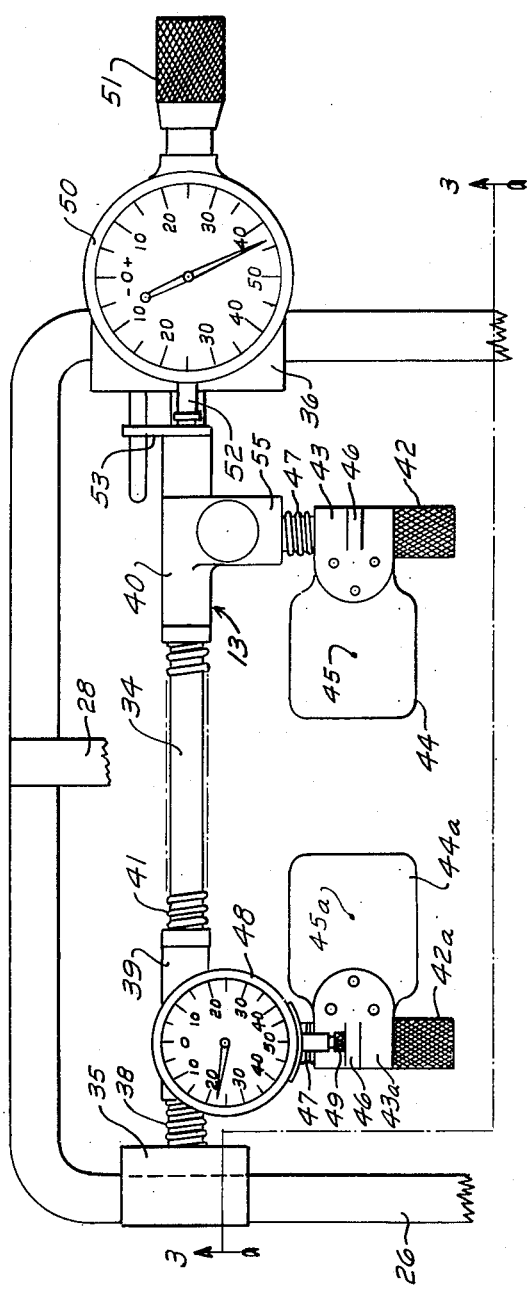
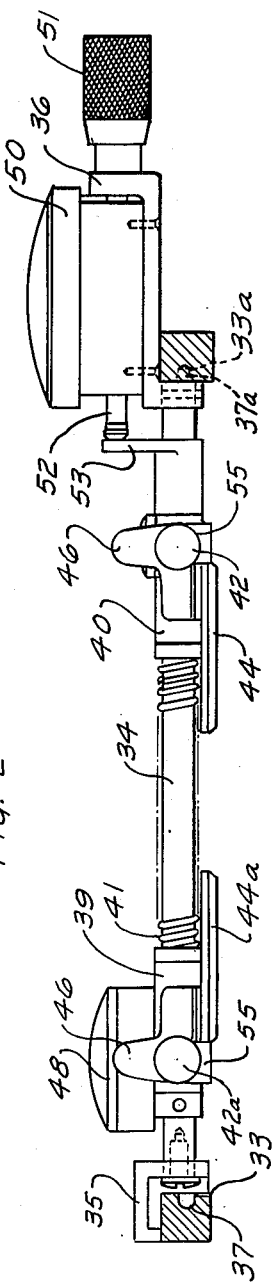
INVENTOR.
TALBERT ABRAMS
MILFORD B. MOORE
CLYDE B. VAN KIRK Patented Feb. 20, 1945

2,369,634

UNITED STATES PATENT OFFICE 2,369,634

CONTOUR FINDER

Talbert Abrams, Milford B. Moore, and Clyde B. Van Kirk, Lansing, Mich., assignors to Talbert Abrams, doing business as Abrams Instrument Company, Lansing, Mich.

Application January 9, 1943, Serial No. 471,886

4 Claims. (Cl. 33—20)

This invention relates to instrument for obtaining topographic information from aerial photographs.

In aerial mapping it is customary to take a series of photographs, either vertical or oblique, at definite intervals while the airplane carrying the camera flies on a definite course at a definite elevation. The photographs are taken often enough so that there is a relatively wide overlap of adjacent photographs. It is possible to accurately determine the relative elevations of a number of points on the earth's surface by measuring the parallax of those points in two such overlapping vertical aerial photographs, or two oblique aerial photographs rectified to the vertical, taken in the above manner. Essentially the present invention is a device for accurately measuring the parallax in such photographs and thereby determining elevations of points on the ground, although the invention has a number of other uses such as, for example, interpretation of microscopic and X-ray photographs.

One of the objects of the present invention is to provide an instrument of the character mentioned, which is provided with an adjustment to compensate for errors in the photographs produced by tipping and tilting of the camera and distortion and differences in scale of the photographs.

Another object is to provide a neat, compact instrument which is simple and convenient to use.

A still further object is to provide an instrument which can be readily disassembled and packed for convenience in carrying.

Another object is to provide such an instrument having a drawing arm attachment for use in drawing maps from aerial photographs.

For a more detailed description of the invention reference is made to the following specification and the accompanying drawings, wherein—

Figure 2 is a fragmentary plan view on an enlarged scale of a portion of the instrument shown in Figure 1;

Figure 3 is a cross-sectional view taken on substantially the line 3—3 of Figure 2;

Figure 1:
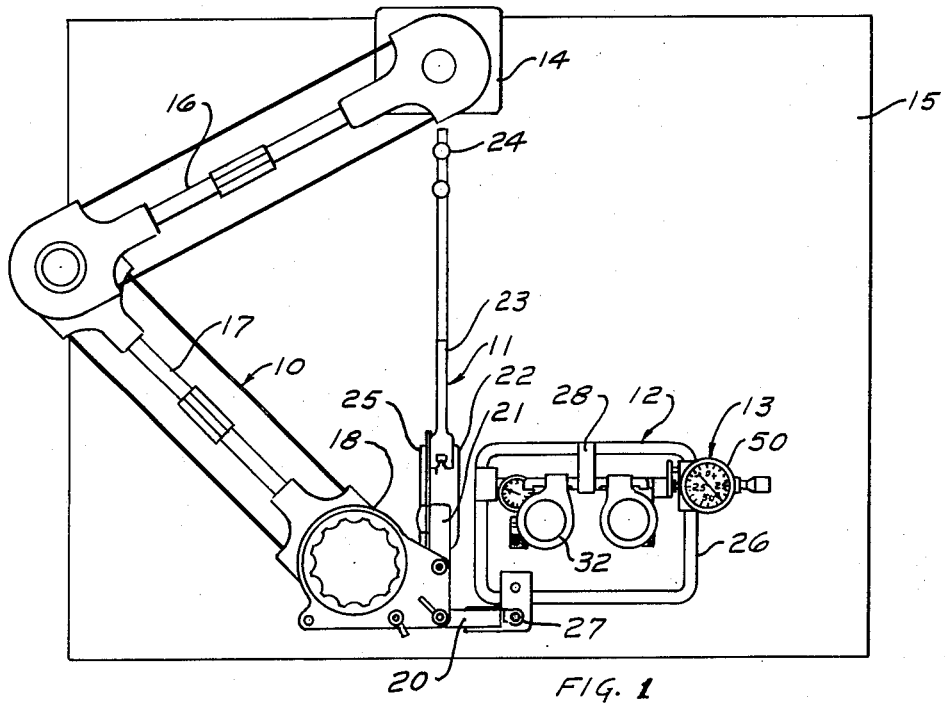
Figure 1 is a plan view of a contour finder embodying the invention.

The instrument in which the invention is embodied is shown in its entirety in Figure 1. In general it comprises four parts, a parallel motion mechanism 10, a drawing or scriber arm attachment 11, a stereoscope 12, and a parallax measuring unit 13. All of these parts are detachably connected together as will be more fully pointed out later, to provide for convenience in carrying.

The parallel motion mechanism 10 may be of a number of forms, but preferably is a standard universal drafting machine. It comprises a bracket 14 capable of being clamped to a table or drawing board 15. An arm 16 is pivotally connected at one end to the bracket 14 and at its other end to a second arm 17. At its free end the arm 17 carries a head 18 which is capable of being rotated and clamped in any desired position. Mounted on the head are two brackets 20 and 21 to which the drawing arm 11 and the stereoscope 12 can be detachably connected in place of the usual straight edges furnished with such a machine.

The drawing arm attachment has a fixed part 22 provided with means to connect it to the bracket 21. Pivotally connected on a horizontal axis to the part 22 is an arm 23 which carries a pencil 24. The arm 23 is pivoted to permit the pencil to be raised from the drawing board 15 and is provided with a coiled spring 25 which normally holds the pencil against the drawing board.

The stereoscope comprises a rectangular frame 26 to which a bracket 27 is fixedly connected. The bracket 27 is provided with means for detachably connecting it to the bracket 20 on the universal drafting machine.

Figures 4, 5:
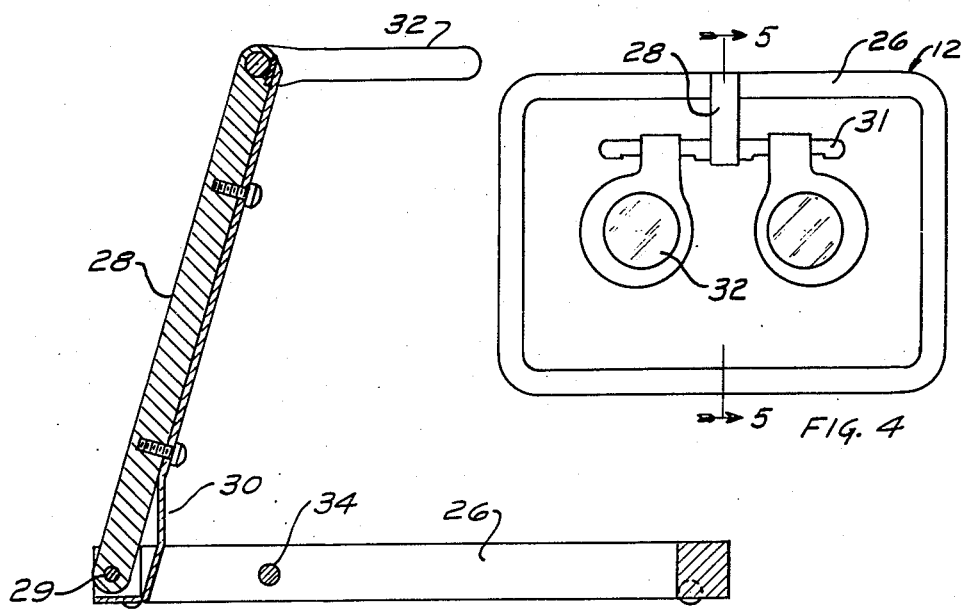
Figure 4 is a plan view of the stereoscope portion of the instrument.
Figure 5 is a cross-sectional view taken on substantially the line 5—5 of Figure 4.

A standard 28 is pivotally connected at its lower end at 29 to the frame 26. A flat spring 30 is rigidly secured to the standard 28 and bears against the frame to hold the standard in erect position, as shown in Figure 5. The lower end of the spring can be dislodged from the position shown in Figure 5 to permit the standard to be swung down into the plane of the frame. At the upper end of the standard a supporting bar 31 is rotatably attached. Two stereoscope lenses 32 are slidably but non-rotatably mounted on the supporting bar 31 to permit variation of the distance between the lenses to accommodate the eyes of different users. The supporting bar 31 may be rotated to bring the lenses 32 into the plane of the standard 28 or to a horizontal position, as shown in Figure 5. The supporting bar is held in either position by the upper end of the leaf spring 30 which bears against the side of the bar 31.

The frame 26 has two shallow sockets 33 at one end thereof and similar sockets 33a at the other end. These are to receive the parallax measuring unit, as will be described more fully presently.

The parallax measuring unit comprises a cylindrical supporting rod 34 having an angle bracket 35 at one end and a Z-shaped bracket 36 at the other end. The bracket 35 is provided with a pair of pins 37 which fit into the sockets 33 in the frame 26. The bracket 36 has similar pins 37a which snap into the sockets 33a in the other end of the frame. The bracket 35 is slidable on the rod 34 for a limited distance against the action of a coiled spring 38 to permit the pins 37 to be withdrawn from their sockets.

A pair of sleeves 39 and 40 are rotatably mounted upon the rod 34. Sleeve 39 is attached so that it cannot slide longitudinally of the bar, while sleeve 40 is slidable as well as rotatable. A coiled spring 41 surrounds the bar 34 and tends to force the sleeves apart. Each sleeve is provided with an integral laterally extending boss 55. Threaded into the bosses 55 on the sides of the sleeves are two adjusting screws 42 and 42a with knurled heads. Mounted on the adjusting nuts 42 and 42a are brackets 43 and 43a which carry indicator members in the form of small glass plates 44 and 44a. These glass plates have small indicator dots 45 and 45a etched in their centers. Each of the brackets 43 has an upstanding ear 46. A coiled spring 47 surrounds each of the adjusting screws 42 and urges the brackets 43 and 43a outwardly against the heads of the screws. Clockwise rotation of the screws 42 and 42a move the brackets 43 and 43a and their glass indicator members toward the bar 34, while counterclockwise movement of the screws permits the springs 47 to move the indicator members in the opposite direction.

A micrometer gauge 48 of the dial type is rigidly mounted upon the boss 55 of the sleeve 39. The movable measuring pin 49 of the gauge 48 abuts the ear 46 on the adjacent bracket 43a. Movement of the bracket 43a by turning the adjusting screw 42a causes the ear 46 to move the pin 49 in or out, and this movement is accurately registered on the dial of the gauge 48.

Another micrometer gauge 50 is secured to the Z-shaped bracket 46. The gauge 50 is provided with an adjusting screw 51 which extends completely through the gauge and terminates in a pin 52. This pin engages an upstanding lug 53 on the sleeve 40 so that clockwise movement of the screw 51 causes the sleeve 40 to move to the left (Figure 2) against the spring 41. Counterclockwise movement of the screw 51 permits the spring 41 to move the sleeve 40 to the right. Movement of the sleeve 40 in either direction is registered on the dial of the gauge 50 as plus or minus movement.

When the instrument is to be employed for determining elevations and drawing contours it is assembled as previously described and illustrated in Figure 1.

Two photographs, taken in succession, are prepared by accurately determining the center of each photograph and marking the same. Then by inspection the point in the right photograph which corresponds to the center point of the left photograph is marked, and the point on the left photograph which corresponds to the center point on the right photograph is also marked. A line is drawn between the two points thus marked on each photograph. These lines establish the line of flight of the airplane from which the photographs were taken and determine the stereoscopic base of the photographs which is used in solving the constant of the instrument.

There are various methods of mounting the two photographs in proper relationship to each other on the drawing board. The simplest is to temporarily fasten the left photograph to the drawing board by means of a pin passed through its center point. The right photograph is then fastened to the board by means of a pin through the point in the right photograph which corresponds to the center point of the left photograph. Both prints are then swung about this point until the two stereoscopic base lines coincide with a straight edge held against the two pins. The photographs are then permanently fastened to the drawing board in that position by thumb tacks or tape.

The stereoscope 12 and the attached parallax measuring unit 13 are then placed over the photographs. The head 18 of the universal drafting attachment is loosened and the frame 26 is rotated until the dots 45 and 45a in the two indicator members 44 and 44a coincide with the stereoscopic base lines of the two photographs. The head of the drafting machine is then clamped to hold the frame 26 in that relative position. The frame 26 can then be moved about over the two photographs and always maintain the same relationship between the two indicator dots 45 and 45a and the stereoscopic base lines of the photograph.

In determining elevations it is desirable to set the two indicator dots over a low point in the landscape covered by the two photographs. This may be done by looking with one eye through the left lens 32 of the stereoscope and then moving the indicator member about until the left indicating dot 45a is over the desired point. The photographs are then viewed with both eyes and it is possible that two dots will be seen. If that is the case, the screw 51 is rotated until the dots appear to merge and appear to be at ground level. The indicator gauge 50 may then be set to zero and all other elevations can be measured with this point as a base.

The frame 26 may be moved about over the two photographs and as long as the dots remain fused so that but one dot appears, and that dot appears to lie at ground level, the dots are over points on the photographs which are at the same elevation as that of the base elevation. If the instrument is moved so that the indicator dots are over an elevation higher than that of the base elevation the two dots will appear to separate transversely or in the direction of the axis of the bar 34, hereinafter called the X direction. To bring them together again in the X direction it is necessary to adjust the screw 51. When the two dots are again brought together the distance which the right hand dot 45 moves relative to the left hand dot 45a is indicated by the gauge 50. By use of the formula which will be set forth hereinafter the elevation of the second point above that of the front point may be easily determined.

When moving the instrument from one point to another the dots appear to separate not only in the X direction but also in a direction at right angles thereto, herein referred to as the Y direcion. This indicates that there is some slight error in the photographs which may be due to many diverse causes. In order to accurately measure changes in the X direction, it is necessary to compensate for any diversity in the Y direction.

This is done by adjusting the screw 42a to bring the dots together in the Y direction. Measurement of the diversity of the dots in the Y direction, by means of the gauge 48, serves to indicate relative tip and tilt.

If several points of known elevation are found in the photographs, the constant for the two photographs may be secured by taking the readings of the gauge 50 for these different points and dividing the differences in elevation thereof by the difference in gauge readings of the same points. The constant will be expressed in terms of feet per unit on the gauge. If the gauge is graduated in millimeters then the constant will be in feet per millimeter. With this constant known, any number of points of unknown elevation can be determined by obtaining the gauge readings thereof and multiplying the same by the constant.

Contours may be drawn on a sheet of paper directly from the photographs by mounting the sheet of paper beneath the pencil 24 on the arm 23 and bringing the two indicator dots together at ground level over a point having an elevation the same as that of the desired contour. The frame 26 is then moved about over the photograph, always maintaining the dots 45 and 45a in merged or fused relationship and at ground level. The pencil point will trace this contour on the paper. Contours may be drawn also by determining the elevation of a large number of points on the two photographs and marking them on the paper by means of the pencil 24. The contours are then drawn in free hand or by the use of curves in the conventional manner.

In using the instrument to obtain elevations or to draw contours, the operator must be careful not only to fuse the two images of the dots 45 and 45a, but to see that they appear to be at ground level. A person endowed with good stereoscopic vision can maintain the dots fused while moving the single image thereof a considerable distance above what appears to be ground level. With a little practice the placing of the image on the ground level of the stereoscopic model becomes relatively easy and certain.

Planimetric detail is transferred to a sheet of paper by looking at the left dot 45a only and by moving it around the left photograph. The pencil will trace the desired objects directly upon the paper. If desired, a pantograph may be attached to the drawing arm so as to enlarge or reduce the scale of the image traced on the paper.

The instrument may be used also as a simple stereoscope to quickly determine roughly the elevation of points on the two photographs without recourse to the parallax measuring unit 13. In using the device in this manner the parallax measuring unit is removed from the stereoscope frame 26 and the two photographs are simply viewed through the stereoscope lenses.

It will be seen from the foregoing that his invention provides a simple and compact device which can be easily disassembled for convenience in carrying. Furthermore, the provision for movement of the indicator members by the screws 42 and 42a compensates for errors in the photographs.

The scope of the invention is indicated in the appended claims.

We claim:

1. In a device of the character described, a frame member, a pair of stereoscope lenses attached to said frame member and located thereabove, an elongated extensible and contractible indicator guide member comprising two relatively movable telescoping sections, said members being provided with cooperating interlocking means detachably securing said members together when said guide member is extended, spring means associated with said indicator guide member tending to extend the same, and a pair of indicators on said indicator guide member and located below said stereoscope lenses.

2. In a device of the character described, a frame member, a pair of stereoscope lenses attached to said frame member and located thereabove, an elongated extensible and contractible indicator guide member comprising two relatively movable sections, said members being provided with cooperating interlocking means detachably securing said members together when said guide member is extended, means associated with said guide member for extending the same, and a pair of indicators on said indicator guide member and located below said stereoscope lenses.

3. A device of the character defined in claim 2 wherein said means comprises projections on one member and cooperating recesses in the other member for receiving said projections.

4. In a device of the character described, a frame member, a pair of stereoscope lenses attached to the frame member and located thereabove, an elongated extensible and contractible indicator guide member, said guide member comprising two relatively movable telescoping sections, said members being provided with cooperating interlocking means detachably securing said members together when said guide member is extended, spring means associated with said guide member tending to extend the same, and a pair of indicators on said indicator guide member located below said stereoscope lenses, one of said indicators being slidable longitudinally of said guide member.

TALBERT ABRAMS.
MILFORD B. MOORE.
CLYDE B. VAN KIRK.